(12) United States Patent
Miao et al.

(10) Patent No.: US 11,792,669 B2
(45) Date of Patent: Oct. 17, 2023

(54) MEASUREMENT METHOD, DEVICE, AND SYSTEM

(71) Applicant: HUAWEI TECHNOLOGIES CO., LTD., Guangdong (CN)

(72) Inventors: Jinhua Miao, Shenzhen (CN); Jian Zhang, Shenzhen (CN); Li Chai, Shenzhen (CN); Wei Quan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 110 days.

(21) Appl. No.: 16/787,568

(22) Filed: Feb. 11, 2020

(65) Prior Publication Data

US 2020/0178107 A1 Jun. 4, 2020

Related U.S. Application Data

(63) Continuation of application No. PCT/CN2017/097278, filed on Aug. 11, 2017.

(51) Int. Cl.
| | | |
|---|---|---|
| *H04W 24/10* | (2009.01) | |
| *H04W 76/27* | (2018.01) | |
| *H04W 24/08* | (2009.01) | |
| *H04W 72/542* | (2023.01) | |
| *H04W 16/32* | (2009.01) | |

(52) U.S. Cl.
CPC .......... *H04W 24/10* (2013.01); *H04W 24/08* (2013.01); *H04W 72/542* (2023.01); *H04W 76/27* (2018.02); *H04W 16/32* (2013.01)

(58) Field of Classification Search
CPC ... H04W 24/10; H04W 24/08; H04W 72/085; H04W 76/27; H04W 16/32
See application file for complete search history.

(56) References Cited

U.S. PATENT DOCUMENTS

| 9,743,448 B2 * | 8/2017 | Futaki .................... H04B 7/024 |
| 10,447,441 B2 * | 10/2019 | Futaki .................... H04L 5/001 |
| 11,212,780 B2 * | 12/2021 | Wei .................... H04W 36/0055 |

(Continued)

FOREIGN PATENT DOCUMENTS

| CN | 101374278 B | 2/2012 |
| CN | 102355692 A | 2/2012 |

(Continued)

OTHER PUBLICATIONS

Office Action issued in Chinese Application No. 201780093713.9 dated Oct. 29, 2020, 28 pages (with English translation).

(Continued)

*Primary Examiner* — Chi H Pham
*Assistant Examiner* — Raul Rivas
(74) *Attorney, Agent, or Firm* — Fish & Richardson P.C.

(57) ABSTRACT

The present disclosure relates to measurement methods, devices, and systems. One example method includes receiving, by a terminal, configuration information sent by a network device, where the configuration information is used by the terminal to measure a to-be-measured object, and measuring, by the terminal, at least one to-be-measured object in an RRC idle mode based on the configuration information to obtain a measurement result of the at least one to-be-measured object.

19 Claims, 7 Drawing Sheets

(56) References Cited

U.S. PATENT DOCUMENTS

| 2015/0365872 | A1 | 12/2015 | Dudda et al. | |
|---|---|---|---|---|
| 2016/0021592 | A1 | 1/2016 | Vesely et al. | |
| 2016/0316508 | A1* | 10/2016 | Hong | H04W 76/15 |
| 2020/0145889 | A1* | 5/2020 | Yamada | H04W 36/00837 |

FOREIGN PATENT DOCUMENTS

| CN | 102378240 | A | 3/2012 |
|---|---|---|---|
| CN | 102932772 | A | 2/2013 |
| CN | 103249078 | A | 8/2013 |
| CN | 103260175 | A | 8/2013 |
| CN | 103634838 | A | 3/2014 |
| CN | 104581777 | A | 4/2015 |
| CN | 104737579 | A | 6/2015 |
| CN | 102752787 | B | 9/2016 |
| CN | 106851751 | A | 6/2017 |
| JP | 2016213805 | A | 12/2016 |
| WO | 2014109561 | A1 | 7/2014 |
| WO | 2017022902 | A1 | 2/2017 |
| WO | 2017034230 | A1 | 3/2017 |

OTHER PUBLICATIONS

Nokia et al.,"Considerations on fast access inter-site small cells in NR",3GPP TSG-RAN WG2 NR Adhoc #2, R2-1706602, XP051301104, Qingdao, China, Jun. 27-29, 2017, 9 pages.

Ericsson, "Triggers for logged MDT measurement reporting",3GPP TSG-RAN WG2 #69, R2-101426, XP002629991, San Francisco, USA, Feb. 22-26, 2010, 3 pages.

CMCC et al., "Neighbouring Cell Measurements Logging and Reporting",3GPP TSG-RAN WG2 Meeting #71, R2-104552, XP05045172, Madrid, Spain, Aug. 23-27, 2010, 2 pages.

Extended European Search Report issued in European Application No. 17920734.5 dated Jun. 16, 2020, 13 pages.

Office Action issued in Chinese Application No. 201780093713.9 dated Apr. 12, 2021, 18 pages (with English translation).

3GPP TS 36.304 V13.6.0: "3rd Generation Partnership Project,Technical Specification Group Radio Access Network, Evolved Universal Terrestrial Radio Access (E-UTRA), User Equipment (UE) procedures in idle mode(Release 13)", Jun. 2017, 46 pages.

3GPP TS 36.133 V14.4.0:"3rd Generation Partnership Project,Technical Specification Group Radio Access Network, Evolved Universal Terrestrial Radio Access (E-UTRA), requirements for support of radio resource management Release 14)",Jun. 2017, 68 pages.

3GPP TS 36331-d61: 3rd Generation Partnership Project,Technical Specification Group Radio Access Network, Evolved Universal Terrestrial Radio Access (E-UTRA);Radio Resource Control (RRC),Protocol specification(Release 13),Jun. 2017, 278 pages.

PCT International Search Report and Written Opinion in International Application No. PCT/CN2017/097,278, dated Apr. 27, 2018, 15 pages (With English Translation).

EPO Communication pursuant to Article 94(3) EPC issued in European Application No. 17920734.5 dated Feb. 23, 2022, 6 pages.

* cited by examiner

MEASUREMENT METHOD, DEVICE, AND SYSTEM

CROSS-REFERENCE TO RELATED APPLICATIONS

This application is a continuation of International Application No. PCT/CN2017/097278, filed on Aug. 11, 2017, the disclosure of which is hereby incorporated by reference in its entirety.

TECHNICAL FIELD

This application relates to the communications field, and in particular, to a measurement method, a device, and a system.

BACKGROUND

With rapid development of communications technologies, a carrier aggregation (CA) technology is introduced into a standard. A plurality of carriers are aggregated to support higher transmission bandwidth, so that user equipment (UE) performs uplink transmission on at least two carriers. Each carrier corresponds to one cell, including a primary cell (Pcell) and a secondary cell (SCell). Currently, a PCell in CA aggregation is a cell initially accessed by UE, is responsible for radio resource control (RRC) communication with the UE, provides security input, and is determined during connection establishment. In downlink (DL), a carrier corresponding to the PCell is a DL primary component carrier (DL PCC). In uplink (UL), a carrier corresponding to the PCell is a UL primary component carrier (UL PCC). An SCell is added by using an RRC connection reconfiguration message after an RRC connection initial security activation procedure, and is used to provide an additional radio resource. In downlink, a carrier corresponding to the SCell is a DL secondary component carrier (DL SCC), and in uplink, a carrier corresponding to the SCell is a UL secondary component carrier (UL SCC).

Currently, a process of adding an SCell for UE is shown in FIG. 1. After an RRC connection is first established between a base station and the UE, and after the UE enters an RRC connected mode, a PCell performs a measurement configuration on the UE. The measurement configuration includes a to-be-measured object and a condition for reporting a measurement report. After receiving the measurement configuration, the UE performs a measurement for the SCell. After the measurement is completed, if a measured value satisfies the condition for reporting a measurement report, the UE reports a measurement report to the base station. After receiving the measurement report, the PCell performs SCell addition and activation processes.

It can be learned from the foregoing process of adding the SCell that a time used for two configurations and one measurement is required; however, adding the SCell belongs to an inter-frequency measurement and usually takes a very long time. Therefore, too much RRC connected mode time is occupied from the measurement configuration to sending of the measurement report. Consequently, data transmission efficiency of a communications system is reduced. With development of technologies, a quantity of carriers supported by CA has currently increased to 32, and more secondary cells need to be added for the UE. Consequently, the occupied RRC connected mode time is further increased, and the data transmission efficiency of the communications system is further reduced.

SUMMARY

Embodiments of this application provide a measurement method, a device, and a system, to avoid occupying an RRC connected mode in a measurement process, and improve data transmission efficiency of a communications system.

To achieve the foregoing objectives, the following technical solutions are used in the embodiments of this application.

According to a first aspect, a measurement method is provided, and is applied to UE. The method may include: receiving, by the UE, configuration information sent by a network device, where the configuration information is used by the UE to measure a to-be-measured object; and measuring, by the UE, at least one to-be-measured object in an RRC idle mode based on the configuration information, to obtain a measurement result of the at least one to-be-measured object.

According to the measurement solution provided in this application, the UE performs the measurement in the RRC idle mode, to avoid occupying an RRC connected mode in a measurement process, improve data transmission efficiency in the RRC connected mode, and further improve data transmission efficiency of a communications system.

With reference to the first aspect, in a possible implementation, the measuring, by the UE, at least one to-be-measured object in an RRC idle mode based on the configuration information may be specifically implemented as: measuring, by the UE, the at least one to-be-measured object in the RRC idle mode based on the configuration information, where the configuration information is used to instruct the UE to measure the to-be-measured object in the RRC idle mode. The network device instructs, by using the configuration information, the UE to perform the measurement in the RRC idle mode. This is easy to implement, a slight change is made to the UE, and compatibility is high.

With reference to the first aspect or the foregoing possible implementation, in a possible implementation, the measuring, by the UE, at least one to-be-measured object in an RRC idle mode based on the configuration information may be specifically implemented as: measuring, by the UE, the at least one to-be-measured object in the RRC idle mode based on a notification of the network device or a preconfigured rule, and the configuration information, where the notification of the network device or the preconfigured rule is used to instruct the UE to measure the to-be-measured object in the RRC idle mode. In this implementation, the notification of the network device or the preconfigured rule is used to instruct the UE to perform the measurement in the RRC idle mode based on the configuration information when receiving the configuration information. A sending moment of the notification of the network device or a configuration moment of the preconfigured rule, or a sending moment of the notification of the network device or content of the preconfigured rule may be determined based on an actual requirement. This is not specifically limited in this solution of this application, so that flexibility of this solution is improved.

With reference to any one of the first aspect or the foregoing possible implementations, in a possible implementation, the configuration information may be actively sent by the network device, or may be sent by the network device based on a request of the UE. When the configuration information is sent by the network device based on the request of the UE, before the receiving, by the UE, configuration information sent by a network device, the measurement method provided in this application may further include: sending, by the UE, a measurement request indication to the network device, where the indication is used to instruct the network device to send the configuration information.

With reference to any one of the first aspect or the foregoing possible implementations, in a possible implementation, the receiving, by the UE, configuration information sent by a network device may be specifically implemented as: receiving, by the UE, a system broadcast message that is sent by the network device and that includes the configuration information; or receiving, by the UE, an RRC connection release message that is sent by the network device and that includes the configuration information. In this implementation, a specific implementation in which the network device sends the configuration information when the UE is in the RRC idle mode or RRC connected mode is provided, so that this solution of this application covers a plurality of application scenarios.

With reference to any one of the first aspect or the foregoing possible implementations, in a possible implementation, before the measuring, by the UE, at least one to-be-measured object in an RRC idle mode based on the configuration information, to obtain a measurement result of the at least one to-be-measured object, the measurement method provided in this application may further include: determining, by the UE, whether the UE has a UE feature for performing a measurement; and if the UE has the UE feature for performing a measurement, measuring, by the UE, the at least one to-be-measured object in the RRC idle mode based on the configuration information, to obtain the measurement result of the at least one to-be-measured object. To perform forward compatibility on successive generation of UE products, in this implementation, the UE determines, based on the feature of the UE, whether to measure the to-be-measured object based on the configuration information when receiving the configuration information.

Optionally, the UE feature for performing a measurement may include but is not limited to at least one of the following features: a capability of the UE that is higher than or equal to a preset capability, a type of a service to be initiated by the UE, a preset UE type, and the like.

With reference to any one of the first aspect or the foregoing possible implementations, in a possible implementation, after the measuring, by the UE, at least one to-be-measured object in an RRC idle mode based on the configuration information, to obtain a measurement result of the at least one to-be-measured object, the measurement method provided in this application may further include: sending, by the UE, a measurement report to the network device, where the measurement report includes report content of some or all of the at least one to-be-measured object, and report content of one to-be-measured object includes identification (ID) information of the to-be-measured object, or ID information and a measurement result of the to-be-measured object. In this implementation, the UE feeds back the report to the network device based on the measurement performed by the UE in the RRC idle mode on the to-be-measured object, to respond to the configuration information sent by the network device.

With reference to any one of the first aspect or the foregoing possible implementations, in a possible implementation, the measurement report may include: report content of a to-be-measured object that is in the at least one to-be-measured object and whose measurement result satisfies a preset condition; or the measurement report may include: report content of the at least one to-be-measured object.

With reference to any one of the first aspect or the foregoing possible implementations, in a possible implementation, after the measuring, by the UE, at least one to-be-measured object in an RRC idle mode based on the configuration information, to obtain a measurement result of the at least one to-be-measured object, the measurement method provided in this application may further include: if the UE enters an RRC connection establishment process or an RRC connected mode, sending, by the UE, the measurement report to the network device; and if the UE is in the RRC idle mode, measuring, by the UE, the at least one to-be-measured object in the RRC idle mode based on the configuration information again, to obtain a measurement result of the at least one to-be-measured object, where a latest measurement result is recorded for a same to-be-measured object. Further, optionally, content in this implementation may be cyclically performed for a plurality of times until the UE enters the RRC connection establishment process or the RRC connected mode, and then the UE sends the measurement report to the network device, to ensure that content of the measurement report is in a latest network state.

With reference to any one of the first aspect or the foregoing possible implementations, in a possible implementation, the sending, by the UE, the measurement report to the network device may be specifically implemented as: sending, by the UE, the measurement report to the network device in the RRC connected mode by using RRC signaling or a media access control (MAC) control element (CE); or sending, by the UE, the measurement report to the network device by using an Msg3 message or an Msg5 message in the RRC connection establishment process. In this implementation, specific implementations in which the UE sends the measurement report to the network device in different scenarios are provided.

With reference to any one of the first aspect or the foregoing possible implementations, in a possible implementation, before the sending, by the UE, the measurement report to the network device, the measurement method provided in this application may further include: receiving, by the UE, a request message that is sent by the network device and that is used to request the UE to send the measurement report; and the sending, by the UE, the measurement report to the network device may be specifically implemented as: after receiving the request message, sending, by the UE, the measurement report to the network device. In this implementation, the UE sends the measurement report based on the request of the network device, to implement reporting as required and save system resources.

With reference to any one of the first aspect or the foregoing possible implementations, in a possible implementation, the request message used to request the UE to send the measurement report may include a random access response (RAR) message or an Msg4 message, and a function of the request message may be implemented by using indication information in the message. In this implementation, specific implementations in which the network device sends the request message in different scenarios are provided.

With reference to any one of the first aspect or the foregoing possible implementations, in a possible implementation, the measurement report includes report content of to-be-measured objects arranged in descending order of measurement results.

With reference to any one of the first aspect or the foregoing possible implementations, in a possible implementation, the configuration information may further include at least one of the following information: the preset condition, bandwidth information of the to-be-measured object, information indicating whether the to-be-measured object is a licensed carrier, period information, and the UE feature for performing a measurement. In content included in the configuration information, a specific manner of measuring the to-be-measured object by the UE based on the configuration information is configured.

With reference to any one of the first aspect or the foregoing possible implementations, in a possible implementation, the preset condition may include: a to-be-measured object measurement criterion, or a preset event, or the measurement result is greater than or equal to a preset threshold.

With reference to any one of the first aspect or the foregoing possible implementations, in a possible implementation, the to-be-measured object includes: a to-be-measured cell, or a to-be-measured carrier, or a to-be-measured beam, or a to-be-measured pilot.

With reference to any one of the first aspect or the foregoing possible implementations, in a possible implementation, the configuration information may further include ID information of the at least one to-be-measured object. In this implementation, the at least one to-be-measured object is specified in the configuration information. Certainly, the at least one to-be-measured object may alternatively be customized by the UE. For example, the at least one to-be-measured object may be a to-be-measured object that already serves the UE within a preset time period, or a to-be-measured object that currently serves the UE.

With reference to any one of the first aspect or the foregoing possible implementations, in a possible implementation, ID information of a to-be-measured object is used to uniquely identify the to-be-measured object. Any information that can be used to uniquely determine a to-be-measured object may be referred to as the ID information of the to-be-measured object described in this application. Optionally, the ID information of the to-be-measured object may include but is not limited to: a physical layer cell ID of the to-be-measured object, or a conversion ID of a physical layer cell ID of the to-be-measured object, or a global cell ID of the to-be-measured object, or a conversion ID of a global cell ID of the to-be-measured object, or center frequency information of the to-be-measured object, or frequency information of a to-be-measured carrier.

With reference to any one of the first aspect or the foregoing possible implementations, in a possible implementation, the configuration information may further include a measurement parameter, and the measuring, by the UE, at least one to-be-measured object in an RRC idle mode based on the configuration information may be specifically implemented as: measuring, by the UE, the measurement parameter for the at least one to-be-measured object in the RRC idle mode based on the configuration information. In this implementation, the network device specifies, in the configuration information, the measurement parameter for measuring the to-be-measured object. Certainly, the measurement parameter used when the UE measures the to-be-measured object may alternatively be stipulated in a preset rule or a protocol.

According to a second aspect, another measurement method is provided, and is applied to a network device. The method may include: sending, by the network device, configuration information, where the configuration information is used by UE to measure a to-be-measured object; and receiving, by the network device, a measurement report sent by the UE, where the measurement report is obtained by the UE by measuring at least one to-be-measured object in an idle mode.

According to the measurement solution provided in this application, the UE measures the to-be-measured object in the RRC idle mode, to avoid occupying an RRC connected mode in a measurement process, improve data transmission efficiency in the RRC connected mode, and further improve data transmission efficiency of a communications system.

With reference to the second aspect, in a possible implementation, the configuration information is used to instruct the UE to measure the to-be-measured object in the RRC idle mode. The network device instructs, by using the configuration information, the UE to perform the measurement in the RRC idle mode. This is easy to implement, a slight change is made to the UE, and compatibility is high.

With reference to the second aspect or the foregoing possible implementation, in a possible implementation, the sending, by the network device, configuration information may be specifically implemented as: sending, by the network device, a system broadcast message including the configuration information; or sending, by the network device, an RRC connection release message including the configuration information. In this implementation, a specific implementation in which the network device sends the configuration information to the UE in the RRC idle mode or RRC connected mode is provided, so that this solution of this application covers a plurality of application scenarios.

With reference to any one of the second aspect or the foregoing possible implementations, in a possible implementation, the configuration information may be actively sent by the network device, or may be sent by the network device based on a request of the UE. When the configuration information is sent by the network device based on the request of the UE, before the sending, by the network device, configuration information, the measurement method provided in this application may further include: receiving, by the network device, a measurement request indication sent by the UE, where the indication is used to instruct the network device to send the configuration information.

With reference to any one of the second aspect or the foregoing possible implementations, in a possible implementation, before the receiving, by the network device, a measurement report sent by the UE, the measurement method provided in this application may further include: sending, by the network device to the UE, a request message used to request the UE to send the measurement report. In this implementation, the network device instructs, by using the request message, the UE to send the measurement report, to implement reporting as required and save system resources.

With reference to any one of the second aspect or the foregoing possible implementations, in a possible implementation, the request message used to request the UE to send the measurement report may include a random access response (RAR) message or an Msg4 message, and a function of the request message may be implemented by using indication information in the message. In this implementation, specific implementations in which the network device sends the request message in different scenarios are provided.

With reference to any one of the second aspect or the foregoing possible implementations, in a possible implementation, the measurement report includes report content of some or all of the at least one to-be-measured object; and report content of one to-be-measured object includes identification ID information of the to-be-measured object, or identification ID information and a measurement result of the to-be-measured object.

With reference to any one of the second aspect or the foregoing possible implementations, in a possible implementation, after the receiving, by the network device, a measurement report sent by the UE, the measurement method provided in this application may further include: selecting, by the network device based on the measurement report, at least one to-be-measured object and adding the at least one to-be-measured object as a secondary resource of the UE. A specific application scenario of the measurement report is implemented.

The secondary resource is a concept relative to a primary resource. The secondary resource may include: a secondary cell, or a secondary carrier, or a secondary beam, or a secondary pilot.

It should be noted that, specific implementations of the measurement method according to the second aspect are the same as the specific implementations of the measurement method according to the first aspect, refer to the specific implementations of the measurement method according to the first aspect, and details are not described herein again.

According to a third aspect, an embodiment of this application provides UE. The UE may implement a function of the UE in the foregoing method example. The function may be implemented by using hardware, or may be implemented by hardware by executing corresponding software. The hardware or the software includes one or more modules corresponding to the foregoing function.

With reference to the third aspect, in a possible implementation, a structure of the UE includes a processor and a transceiver. The processor is configured to support the UE in performing a corresponding function in the foregoing method. The transceiver is configured to support the UE in communicating with another device. The UE may further include a memory. The memory is configured to: couple to the processor, and store a program instruction and data that are necessary for the UE.

According to a fourth aspect, an embodiment of this application provides a network device. The network device may implement a function implemented by the network device in the foregoing method example. The function may be implemented by using hardware, or may be implemented by hardware by executing corresponding software. The hardware or the software includes one or more modules corresponding to the foregoing function.

With reference to the fourth aspect, in a possible implementation, a structure of the network device includes a processor and a transceiver. The processor is configured to support the network device in performing a corresponding function in the foregoing method. The transceiver is configured to support the network device in communicating with another device. The network device may further include a memory. The memory is configured to: couple to the processor, and store a program instruction and data that are necessary for the network device.

According to a fifth aspect, an embodiment of this application provides a computer storage medium, configured to store a computer software instruction used by the foregoing UE. The computer software instruction includes a program designed to perform the first aspect.

According to a sixth aspect, an embodiment of this application provides a computer storage medium, configured to store a computer software instruction used by the foregoing network device. The computer software instruction includes a program designed to perform the second aspect.

According to a seventh aspect, an embodiment of this application provides a communications system, including the UE according to any one of the foregoing aspects or the possible implementations.

With reference to the seventh aspect, in a possible implementation, the communications system may further include the network device according to any one of the foregoing aspects or the possible implementations.

The solutions according to the third aspect to the seventh aspect are used to implement the measurement method according to the first aspect or the second aspect, and therefore can achieve the same beneficial effects as those in the first aspect or the second aspect. Details are not described herein again.

DESCRIPTION OF EMBODIMENTS

Based on this, this application provides a measurement method, applied to a network device and UE in a wireless communications system. A basic principle of the measurement method is as follows: UE measures a to-be-measured object in an RRC idle mode, to prevent the measurement from occupying an RRC connected mode, thereby improving data transmission efficiency of a communications system.

The network device described in this application is a network side device that provides a communications service for UE in a wireless communications system. In communications systems of different standards, network devices may have different names, but all the network devices may be understood as the network device described in this application. A type of the network device is also not specifically limited in the embodiments of this application. For example, a network device in a universal mobile telecommunications system (UMTS) is referred to as a base station (BS), a network device in an LTE system is referred to as an evolved NodeB (eNB), a network device in a new radio (NR) system is referred to as a next generation NodeB (gNB), or the like. Examples are not listed one by one herein. All network side devices that provide communications services for UE in a wireless communications system may be understood as the network device described in this application.

The UE described in this application is a mobile communications device used by a user. The UE may be a mobile phone, a tablet computer, a notebook computer, an ultra-mobile personal computer (UMPC), a netbook, a personal digital assistant (PDA), an ebook, a mobile television, a wearable device, a personal computer (PC), or the like. In communications systems of different standards, terminals may have different names, but all the terminals may be understood as the UE described in this application. A type of the UE is not specifically limited in the embodiments of this application.

Figure 1:
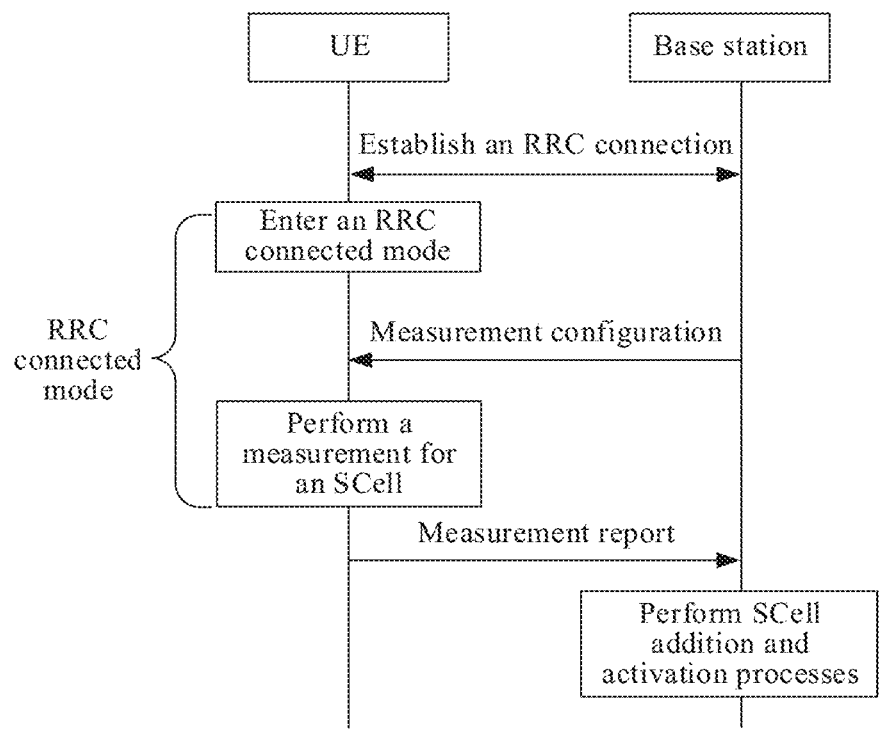
FIG. 1 is a schematic flowchart of adding an SCell for UE in the prior art.
Figure 2:
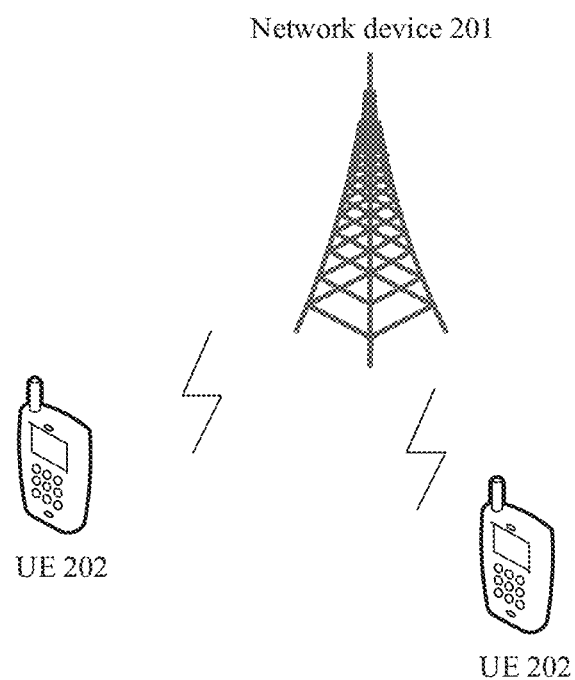
FIG. 2 is a schematic architectural diagram of a wireless communications system in the prior art.

The measurement method provided in this application is applied to a wireless communications system architecture shown in FIG. 2. As shown in FIG. 2, the wireless communications system architecture includes at least one network device 201 and at least one UE 202 that communicates with the network device 201.

It should be noted that FIG. 2 merely shows an example of a wireless communications network architecture. A quantity of network devices 201, a type of the network device 201, a quantity of UEs 202, a type of the UE 202, and the like that are included in the wireless communications system architecture may all be configured based on an actual requirement, and are not specifically limited in FIG. 2.

It should be further noted that, in FIG. 2, the network device 201 is shown as a base station, and the UE 202 is shown as a mobile phone. This is merely an example for description, and does not constitute a limitation.

The wireless communications system architecture shown in FIG. 2 may be an LTE network, a universal mobile telecommunications system (UMTS) network, or another network. A type of a network to which the solutions of this application are applied is not specifically limited in the embodiments of this application.

In addition, in the embodiments of this application, the word such as "example" or "for example" is used to represent giving an example, an illustration, or a description. Any embodiment or design scheme described as an "example" or "for example" in the embodiments of this application should not be explained as having more advantages than another embodiment or design scheme. Exactly, use of the word "example", "for example", or the like is intended to present a related concept in a specific manner, to facilitate understanding.

The following describes in detail the embodiments of this application with reference to accompanying drawings.

Figure 3:
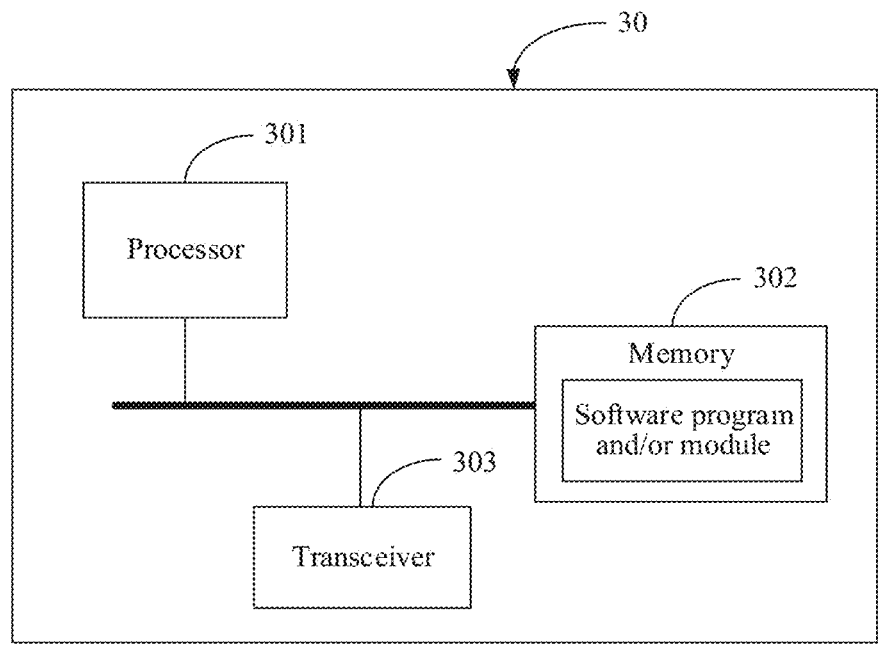
FIG. 3 is a schematic structural diagram of UE according to an embodiment of this application.

According to an aspect, an embodiment of this application provides UE. FIG. 3 shows UE 30 related to the embodiments of this application. The UE 30 may be the UE 202 in the wireless communications system architecture shown in FIG. 2. As shown in FIG. 3, the UE 30 may include a processor 301, a memory 302, and a transceiver 303.

All components of the UE 30 are described in detail below with reference to FIG. 3.

The memory 302 may be a volatile memory, for example, a random access memory (RAM); or a non-volatile memory, for example, a read-only memory (ROM), a flash memory, a hard disk (HDD), or a solid-state drive (SSD); or a combination of the foregoing types of memories. The memory 302 is configured to store program code and a configuration file that can implement the method in this application.

The processor 301 is a control center of the UE 30, and may be a central processing unit (CPU), may be an application-specific integrated circuit (ASIC), or may be configured as one or more integrated circuits, for example, one or more microprocessors (DSP) or one or more field programmable gate arrays (FPGA), that implement the embodiments of this application. The processor 301 may run or execute a software program and/or a module stored in the memory 302, and invoke data stored in the memory 302, to perform various functions of the UE 30.

The transceiver 303 is used for interaction between the UE 30 and another unit. For example, the transceiver 303 may be a transmit and receive antenna of the UE 30.

Specifically, the processor 301 runs or executes the software program and/or the module stored in the memory 302, and invokes the data stored in the memory 302, to perform the following functions:

receiving, by using the transceiver 303, configuration information sent by a network device, where the configuration information is used by the UE to measure a to-be-measured object; and measuring at least one to-be-measured object in an RRC idle mode based on the configuration information, to obtain a measurement result of the at least one to-be-measured object.

Figure 4:
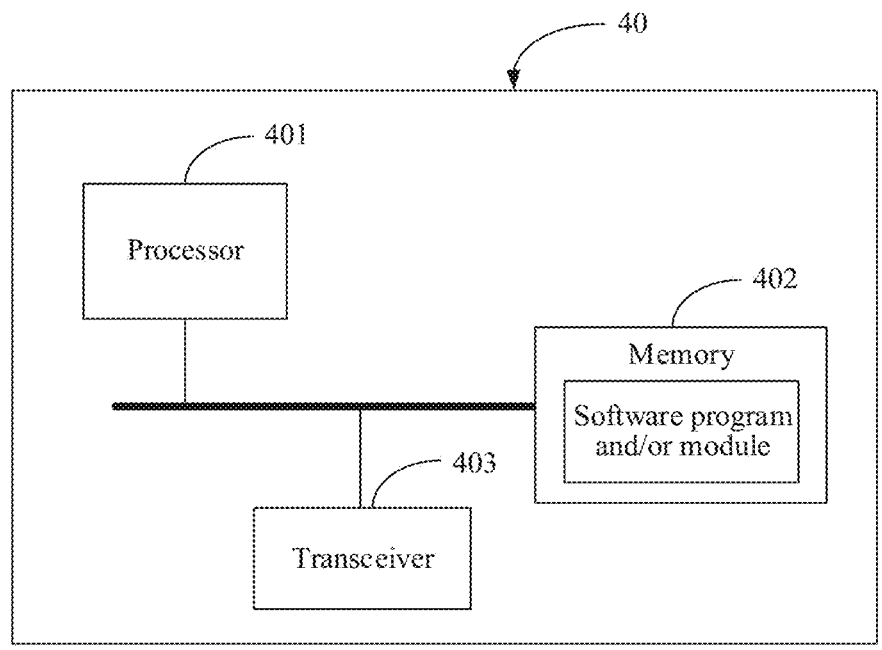
FIG. 4 is a schematic structural diagram of a network device according to an embodiment of this application.

According to another aspect, an embodiment of this application provides a network device. FIG. 4 shows a network device 40 related to the embodiments of this application. The network device 40 may be the network device 201 in the wireless communications system architecture shown in FIG. 2. As shown in FIG. 4, the network device 40 may include a processor 401, a memory 402, and a transceiver 403.

All components of the network device 40 are described in detail below with reference to FIG. 4.

The memory 402 may be a volatile memory, for example, a RAM; or a non-volatile memory, for example, a ROM, a flash memory, an HDD, or an SSD; or a combination of the foregoing types of memories. The memory 402 is configured to store program code and a configuration file that can implement the method in this application.

The processor 401 is a control center of the network device 40, and may be a CPU, may be an ASIC, or may be configured as one or more integrated circuits, for example, one or more DSPs or one or more FPGAs, that implement the embodiments of this application. The processor 401 may run or execute a software program and/or a module stored in the memory 402, and invoke data stored in the memory 402, to perform various functions of the network device 40.

The transceiver 403 is used for interaction between the network device 40 and another unit. For example, the transceiver 403 may be a transmit and receive antenna of the network device 40.

Specifically, the processor 401 runs or executes the software program and/or the module stored in the memory 402, and invokes the data stored in the memory 402, to perform the following functions:

sending configuration information by using the transceiver 403, where the configuration information is used by UE to measure a to-be-measured object; and receiving, by using the transceiver 403, a measurement report sent by the UE, where the measurement report is obtained by the UE by measuring at least one to-be-measured object in an idle mode.

Figure 5:
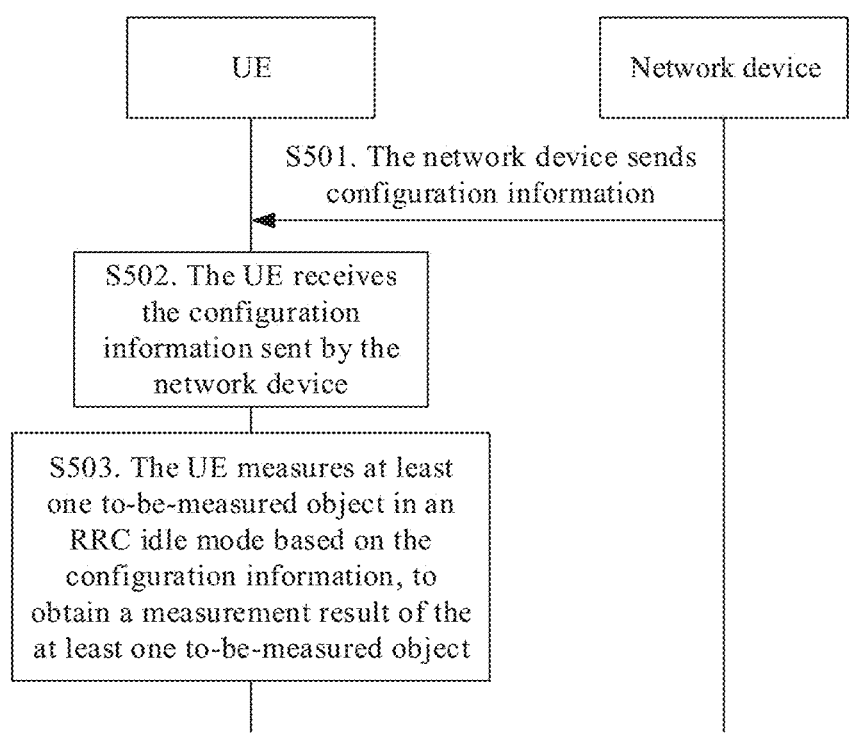
FIG. 5 is a schematic flowchart of a measurement method according to an embodiment of this application.

According to still another aspect, an embodiment of this application provides a measurement method, applied to a process of interaction between UE and a network device in a wireless communications system. In this embodiment of this application, the measurement method provided in this embodiment of this application is described in detail by describing the process of interaction between the UE and the network device. As shown in FIG. 5, the measurement method may include the following steps.

S501. The network device sends configuration information.

The configuration information is used by the UE to measure a to-be-measured object.

Optionally, the configuration information may be only one piece of indication information used by the UE to measure the to-be-measured object when receiving the configuration information. However, specific details such as the to-be-measured object, measurement content, and a measurement scenario are not limited.

Optionally, the configuration information may be used by the UE to measure the to-be-measured object in an RRC idle mode.

Optionally, the configuration information may be information that includes a configuration parameter. The configuration parameter is used to indicate specific details when the UE measures the to-be-measured object.

Different measurement configuration parameters are described in detail below. For the following described configuration parameters, in an actual application, the configuration information may be at least one of the configuration parameters.

First-type configuration parameter: ID information of at least one to-be-measured object.

The at least one to-be-measured object is a measurement target when the UE performs a measurement. Optionally, the to-be-measured object may include: a to-be-measured cell, or a to-be-measured carrier, or a to-be-measured beam, or a to-be-measured pilot. A type of the to-be-measured object is not specifically limited in this embodiment of this application.

ID information of a to-be-measured object is used to uniquely determine the to-be-measured object. ID information of a to-be-measured object is used as a configuration parameter, to indicate a target measurement object when the UE measures a to-be-measured object.

For example, the ID information of the to-be-measured object may include: a physical layer cell ID of the to-be-measured object, or a conversion ID of a physical layer cell ID of the to-be-measured object, or a global cell ID of the to-be-measured object, or a conversion ID of a global cell ID of the to-be-measured object, or center frequency information of the to-be-measured object, or frequency information of the to-be-measured object.

Each to-be-measured object has its own dedicated operating frequency band. Therefore, a to-be-measured object can be uniquely determined by using center frequency information of the to-be-measured object. The center frequency information may be a frequency value of a center frequency, or may be a channel number of a center frequency, or the like. This is not specifically limited in this embodiment of this application.

The physical layer cell ID of the to-be-measured object and the global cell ID of the to-be-measured object are unique IDs allocated to the to-be-measured object from physical layer and global perspectives. A to-be-measured object can be uniquely determined by using a physical layer cell ID of the to-be-measured object and a global cell ID of the to-be-measured object.

The conversion ID of the physical layer cell ID of the to-be-measured object and the conversion ID of the global cell ID of the to-be-measured object are IDs obtained after the physical layer cell ID of the to-be-measured object and the global cell ID of the to-be-measured object are converted by using a mapping relationship. In this way, a to-be-measured object can be uniquely determined by obtaining a physical layer cell ID of the to-be-measured object and a global cell ID of the to-be-measured object by searching the mapping relationship by using a conversion ID of the physical layer cell ID of the to-be-measured object and a conversion ID of the global cell ID of the to-be-measured object.

It should be noted that the conversion ID may have different names, for example, a report ID or an index ID. Any ID that corresponds, by using the mapping relationship, to an ID that can be used to uniquely determine a to-be-measured object is the conversion ID referred to in this application.

For example, Table 1 shows an example of a mapping relationship between a physical layer cell ID of a to-be-measured object and a conversion ID of the physical layer cell ID of the to-be-measured object. As shown in Table 1, assuming that a conversion ID of a physical layer cell ID of a to-be-measured object is an ID 6, it may be determined, based on the mapping relationship shown in Table 1, that the physical layer cell ID of the to-be-measured object is an ID 3, and the to-be-measured object can be uniquely determined by using the ID 3.

TABLE 1

| Physical layer cell ID of a to-be-measured object | Conversion ID of the physical layer cell ID of the to-be-measured object |
| --- | --- |
| ID 1 | ID 4 |
| ID 2 | ID 5 |
| ID 3 | ID 6 |
| . . . | . . . |

It should be noted that. Table 1 shows the mapping relationship by merely using an example, and does not specifically limit content and a form of the mapping relationship.

It should be noted that the foregoing example is merely an example for describing the ID information of the to-be-measured object, and is not a specific limitation thereto. In an actual application, any information that can be used to uniquely determine a to-be-measured object may be used as the ID information of the to-be-measured object described in this application.

Specifically, when the configuration information includes the first-type configuration parameter, to be specific, includes the ID information of the at least one to-be-measured object, the configuration information indicates an object when the UE performs a measurement.

Second-type configuration parameter: bandwidth information of the to-be-measured object.

The bandwidth information of the to-be-measured object reflects a quantity of bandwidth resources occupied by the to-be-measured object. When the configuration information includes the second-type configuration parameter, to be specific, includes the bandwidth information of the to-be-measured object, the configuration information indicates a bandwidth range when the UE performs a measurement.

Third-type configuration parameter: information indicating whether the to-be-measured object is a licensed carrier.

The information indicating whether the to-be-measured object is a licensed carrier is used to indicate whether the to-be-measured object is a licensed carrier. When the configuration information includes the third-type configuration parameter, to be specific, includes the information indicating whether the to-be-measured object is a licensed carrier, the configuration information indicates a feature of the to-be-measured object when the UE performs a measurement, to ensure an accurate measurement, and enable the UE to perform the measurement based on a feature of an unlicensed carrier. For example, a time when a secondary component carrier is in a busy mode and a time when the secondary component carrier is in an idle mode are detected in a listen before talk (LBT) manner; or a received signal strength indication (RSSI) measurement manner is performed.

Fourth-type configuration parameter: period information.

The period information reflects a time interval between two measurements. When the configuration information includes the fourth-type configuration parameter, to be specific, includes the period information, the configuration information indicates a period of a measurement performed by the UE.

Optionally, the period information may be a preset fixed period, or may be configured based on a discontinuous reception period. This is not specifically limited in this embodiment of this application.

Fifth-type configuration parameter: a UE feature for performing a measurement.

Content of the UE feature for performing a measurement is some features of the UE. The feature may be a performance feature, or may be a service feature, or may be a UE type feature. When the configuration information includes the UE feature for performing a measurement, the configuration information instructs the UE that has the UE feature for performing a measurement to measure the to-be-measured object when receiving the configuration information.

For example, the UE feature for performing a measurement may be that a service to be initiated by the UE is traffic intensive, or may be that a terminal type of the UE is a video mobile phone. In an actual application, the UE feature for performing a measurement may be in one or more aspects. This is not specifically limited in this embodiment of this application.

Sixth-type configuration parameter: a measurement parameter.

The measurement parameter is used to indicate a measured value during a measurement. When the configuration information includes the measurement parameter, and the configuration information instructs the UE to measure the to-be-measured object, the measured value is a measurement parameter in the measurement configuration parameters.

For example, the measurement parameter may include but is not limited to: a reference signal received power (RSRP), or reference signal received quality (RSRQ), or a received signal strength indication (RSSI), or a signal to interference plus noise ratio (SINR). In an actual application, a type of the measurement parameter may alternatively be configured based on an actual requirement. The foregoing example does not specifically limit the type of the measurement parameter.

Seventh-type configuration parameter: a maximum quantity of UEs that need to perform a measurement.

When the configuration information includes the maximum quantity of UEs that need to perform a measurement, the configuration information indicates a quantity of to-be-measured objects when the UEs perform the measurements.

It should be noted that, if the configuration information not only includes ID information of at least one to-be-measured cell that indicates at least one to-be-measured object, but also includes a maximum quantity N of UEs that need perform a measurement. When the UEs perform the measurements, if N is less than a quantity of to-be-measured objects indicated by the ID information of the at least one to-be-measured cell, the UEs select, from the at least one to-be-measured object indicated by the ID information of the at least one to-be-measured cell, N to-be-measured objects for the measurements. A specific selection manner is not specifically limited in this embodiment of this application.

Eighth-type configuration parameter: a preset condition.

The preset condition is a preconfigured condition, and if the condition is satisfied, a specific operation can be performed after a measurement is performed.

Optionally, the "specific operation" herein may include but is not limited to: The to-be-measured object is used as a secondary resource, or a measurement result of the to-be-measured object is sent to the network device, or a measurement result of the to-be-measured object is included in a measurement report. Certainly, in an actual application, content of the specific operation may be configured based on an actual requirement. This is not specifically limited in this embodiment of this application.

For example, optionally, the preset condition may include: a to-be-measured object measurement criterion, or a preset event, or the measurement result is greater than or equal to a preset threshold. Content of the preset condition may be configured based on an actual requirement. This is not specifically limited in this embodiment of this application.

For example, when the configuration information includes the preset condition, and the preset condition is the measurement result is greater than or equal to the preset threshold, a definition may be as follows: When the measurement result of the to-be-measured object is greater than or equal to the preset threshold, the to-be-measured object is added to the measurement report.

For example, the preset event may include an existing defined event A4, or content of the preset event may be configured based on an actual requirement. This is not specifically limited in this embodiment of this application. Content of an event such as the defined event A4 is not described in detail in this embodiment of this application.

It should be noted that, certainly, based on an actual requirement, the preset condition may alternatively be configured to be less than or equal to a first preset threshold. Values of the preset threshold and the first preset threshold may be configured based on an actual requirement. This is not specifically limited in this embodiment of this application.

For example, the to-be-measured object measurement criterion may be: A measured value of Srxlev_Scell of the to-be-measured object is greater than 0 and a measured value of Squal_Scell of the to-be-measured object is greater than 0, where $$Srxlev\_Scell = Qrxlevmeas - (Qrxlev\ min + Qrxlevminoffset) - Pcompensation - Qoffsettemp;$$

$$Squal\_Scell = Qqualmeas - (Qqual\ min + Qqualminoffset) - Qoffsettemp.$$

Definitions of all the parameters in the condition are shown in the following Table 2.

TABLE 2

| | |
|---|---|
| Srxlev_Scell | Received value (dB) selected for a neighboring to-be-measured object |
| Squal_Scell | Quality value (dB) selected for a neighboring to-be-measured object |
| $Q_{offsettemp}$ | Offset (dB) between the to-be-measured object and a service object of the UE |
| $Q_{rxlevmeas}$ | Received power (RSRP) of the to-be-measured object |
| $Q_{qualmeas}$ | Signal quality (RSRQ) of the to-be-measured object |
| $Q_{rxlevmin}$ | Minimum required reception range (dBm) for measuring the to-be-measured object |
| $Q_{qualmin}$ | Minimum quality range (dB) for measuring the to-be-measured object |
| $Q_{rxlevminoffset}$ | Offset of a public land mobile network (PLMN) received value |
| $Q_{qualminoffset}$ | Offset of PLMN received quality |
| Pcompensation | If the UE supports coverage enhancement (CE) or bandwidth reduced low complexity (BL) UE, $\max(P_{EMAX1} - P_{PowerClass}, 0) - (\min(P_{EMAX2}, P_{PowerClass}) - \min(PEM_{AX1}, P_{PowerClass}))$ (dB); else: $\max(P_{EMAX1} - P_{PowerClass}, 0)$ (dB) |
| $P_{EMAX1}$, | Maximum transmit power of common UE that is obtained by using a P-Max parameter in a broadcast message system information block (SIB) 1 |
| $P_{EMAX2}$ | Maximum transmit power of UE supporting CE/BL that is obtained by using parameters NS-PmaxList in broadcast message SIBs 1, 3, and 5 |
| $P_{PowerClass}$ | Maximum radio frequency output power of the UE |

The service object of the UE is an object of a same type as that of the to-be-measured object. For example, when the to-be-measured object is a to-be-measured cell, the service object of the UE refers to a serving cell of the UE; or when the to-be-measured object is a to-be-measured carrier, the service object of the UE refers to a service carrier of the UE.

It should be noted that the content of the to-be-measured object measurement criterion is merely a possible implementation, and is not a specific limitation on the to-be-measured object measurement criterion. In an actual application, the to-be-measured object measurement criterion may be deformation or conversion of the content of the foregoing example, and some or all of the parameters listed in Table 2 are included. Therefore, all to-be-measured object measurement criteria constructed by using a measurement criterion idea shall fall within the protection scope of the solutions of this application.

For example, the to-be-measured object measurement criterion may alternatively be an S criterion. Content of the S criterion is not described in detail in this embodiment of this application.

The foregoing described eight types of configuration parameters are merely examples for describing feasible solutions. In an actual application, the configuration information may include at least one of the foregoing eight types of configuration parameters, or the measurement configuration parameter may further include another configuration parameter. Details are not described one by one in this embodiment of this application.

It should be further noted that, in S501, the network device may send the configuration information through broadcast, to be specific, there is no destination UE; or the network device may send the configuration information to the UE. FIG. 5 merely shows a manner of sending the configuration information to the UE in S501, and does not specifically limit the manner.

Further, optionally, in S501, the network device may actively send the configuration information, or may send the configuration information based on a request of the UE. A prerequisite for performing S501 is not specifically limited in this embodiment of this application.

Figure 6A:
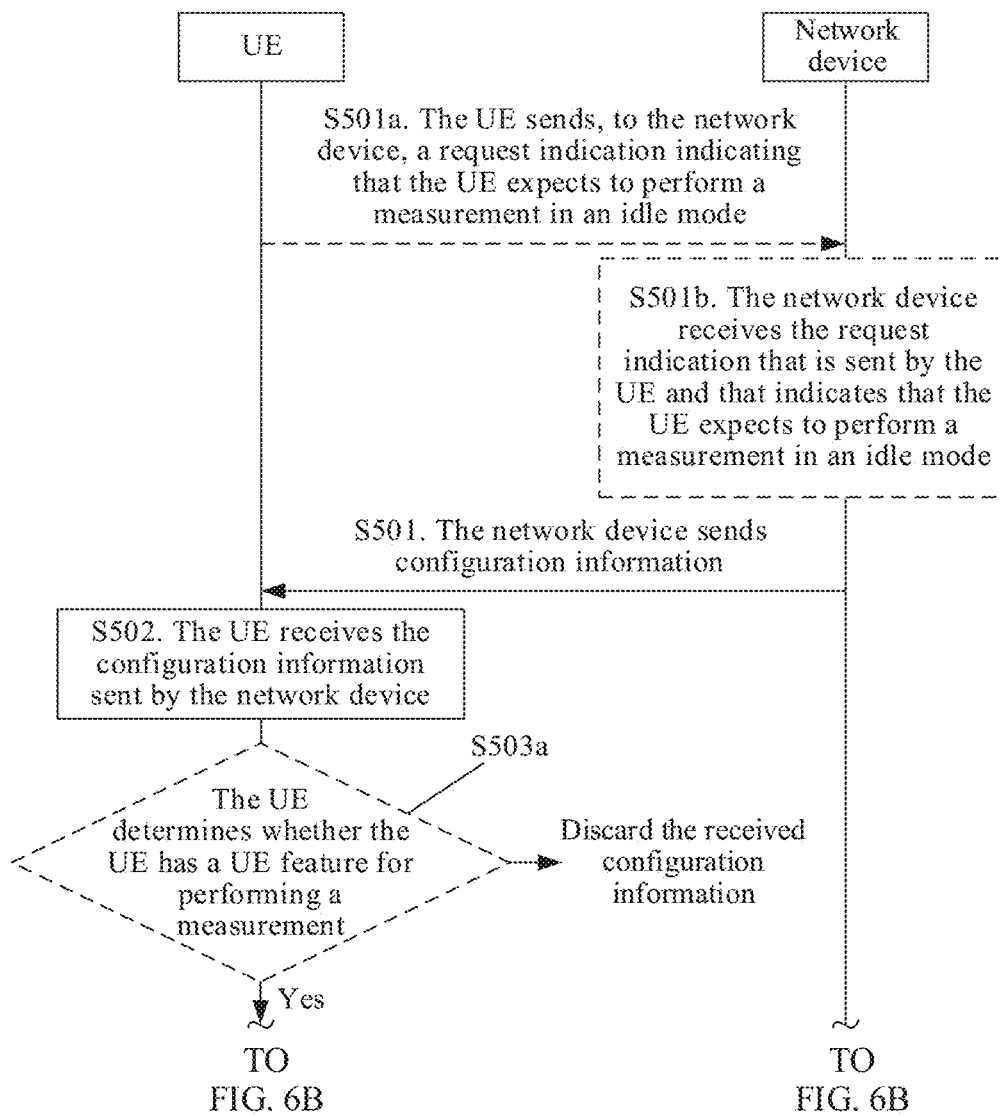
FIG. 6A and FIG. 6B are a schematic flowchart of another measurement method according to an embodiment of this application.
Figure 6B:
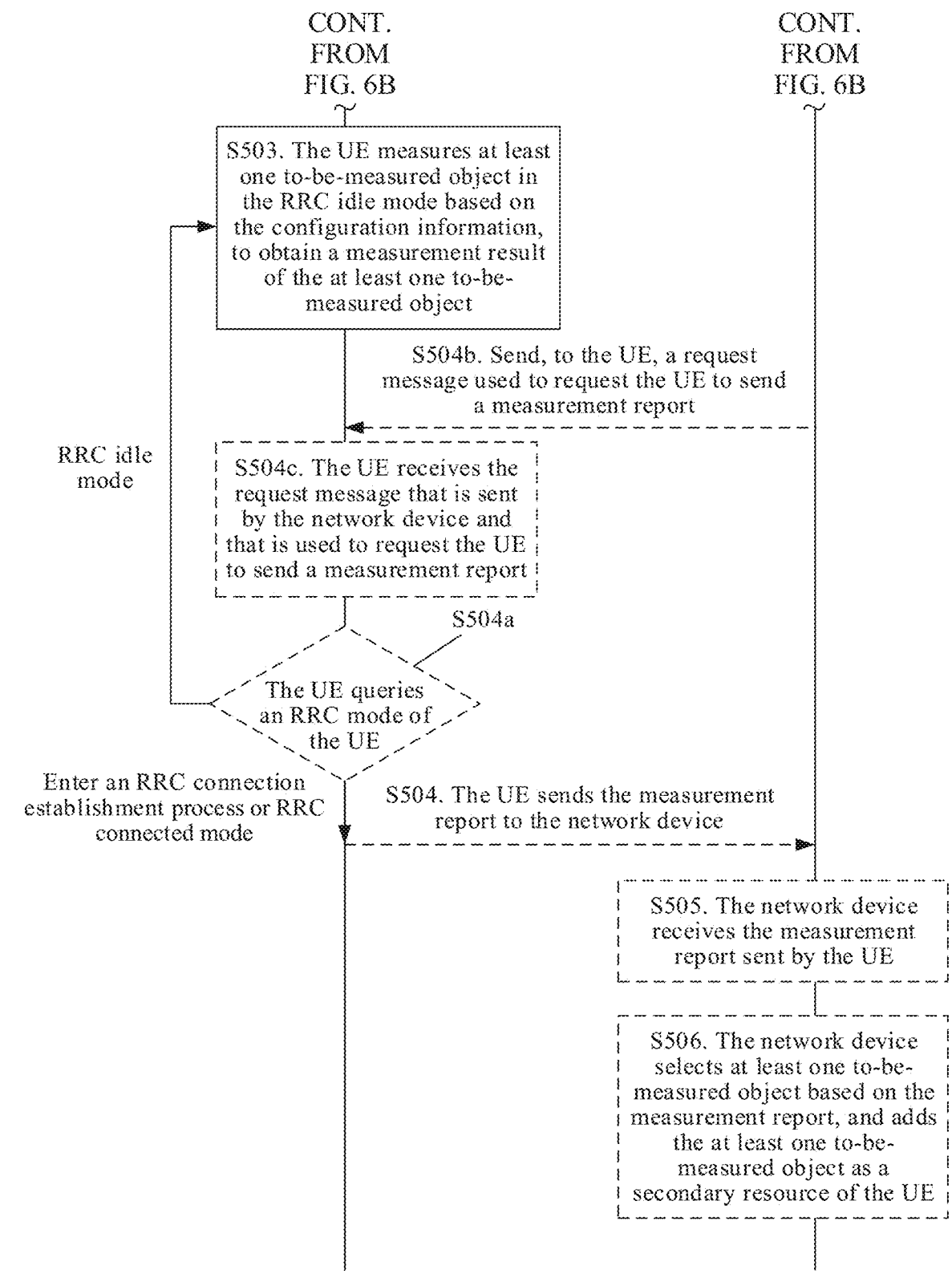

Optionally, when the configuration information is used by the UE to measure the to-be-measured object in the RRC idle mode, if the network device sends the configuration information based on the request of the UE in S501, as shown in FIG. 6A and FIG. 6B, before S501, the measurement method provided in this embodiment of this application may further include S501a and S501b.

S501a. The UE sends, to the network device, a request indication indicating that the UE expects to perform a measurement in the idle mode.

S501b. The network device receives the request indication indicating that the UE expects to perform a measurement in the idle mode.

For example, when the UE is capable of performing a measurement in the RRC idle mode, to reduce a latency in an RRC connected mode, the UE may select to perform a measurement in the RRC idle mode. In this case, the UE sends the request indication to a service object on which the UE camps, and a network device of the service object performs S501.

Specifically, in S501, a specific implementation in which the network device sends the configuration information may include but is not limited to the following two implementations:

Implementation 1: The network device sends a system broadcast message including the configuration information.

In Implementation 1, the network device sends the configuration information through broadcast, and the UE in the RRC idle mode receives the configuration information.

Implementation 2: The network device sends an RRC connection release message including the configuration information.

In Implementation 2, the network device sends the configuration information by using the RRC connection release message, and the UE in the RRC connected mode receives the configuration information.

S502. The UE receives the configuration information sent by the network device.

It should be noted that, the configuration information received by the UE in S502 is the configuration information sent by the network device in S501, and is already described in detail in S501, and details are not described herein again.

Corresponding to the implementation in which the network device sends the configuration information in S501, in S502, the receiving, by the UE, the configuration information may also include the following two implementations.

Implementation A: The UE receives the system broadcast message that is sent by the network device and that includes the configuration information.

Implementation B: The UE receives the RRC connection release message that is sent by the network device and that includes the configuration information.

S503. The UE measures at least one to-be-measured object in the RRC idle mode based on the configuration information, to obtain a measurement result of the at least one to-be-measured object.

Optionally, in S503, when the UE measures the to-be-measured object, the at least one to-be-measured object measured by the UE may be indicated by using ID information of the at least one to-be-measured object that is included in the configuration information, or may be determined by the UE. For example, the UE may determine that the at least one to-be-measured object is a to-be-measured object that serves the UE in a preset time period. Alternatively, the UE may determine that the at least one to-be-measured object is a to-be-measured object that currently serves the UE. A manner of determining the at least one to-be-measured object is not specifically limited in this embodiment of this application. A process of determining the at least one to-be-measured object and content of the determined at least one to-be-measured object are not specifically limited in this embodiment of this application either.

For example, when the to-be-measured object is a to-be-measured cell, the to-be-measured cell may be a neighboring cell co-site with a serving cell of the UE, or the to-be-measured cell may be a cell that serves the UE within preset duration.

It should be noted that in S503, the UE measures the to-be-measured object based on a configuration parameter. The configuration parameter may be included in the configuration information received in S502, or may be predefined and stored in the UE. This is not specifically limited in this embodiment of this application. Specific content of the configuration parameter is already described in detail in S501, and details are not described herein again.

Optionally, S503 may be specifically implemented as: The UE measures a measurement parameter for the at least one to-be-measured object in the RRC idle mode based on the configuration information. The measurement result of the to-be-measured object is a measured value of the measurement parameter. As a configuration parameter, the measurement parameter may be included in the configuration information received in S502, or may be predefined and stored in the UE.

For example, the measurement parameter may be an RSRP, RSRQ, an RSSI, or an SINR, and the measurement result is a value of an RSRP, RSRQ, an RSSI, or an SINR that is specifically measured.

Optionally, in S503, depending on different functions of the configuration information, implementations of S503 are also different. Specifically, the following two cases may be included:

Case 1: The configuration information is used to instruct the UE to measure the to-be-measured object in the RRC idle mode.

In Case 1, S503 is specifically implemented as: The UE measures the at least one to-be-measured object in the RRC idle mode based on the configuration information.

Alternatively:

Case 2: The UE is instructed, by using a notification of the network device or a preconfigured rule instead of using the configuration information, to measure the to-be-measured object in the RRC idle mode.

In Case 2, the UE measures the at least one to-be-measured object in the RRC idle mode based on the notification of the network device or the preconfigured rule, and the configuration information. The notification of the network device or the preconfigured rule is used to instruct the UE to measure the to-be-measured object in the RRC idle mode.

The notification of the network device may be a notification specially used to instruct the UE to measure the to-be-measured object in the RRC idle mode. A sending moment and content of the notification are not specifically limited in this embodiment of this application.

The preconfigured rule may be a protocol executed by the UE, and the protocol stipulates that the UE measures the to-be-measured object in the RRC idle mode when receiving the configuration information. Certainly, the preconfigured rule may alternatively be a configuration rule in another form, for example, a rule that is defined by a manufacturer of the UE and that is executed by the UE. Content and a form of the preconfigured rule are not specifically limited in this embodiment of this application.

Optionally, S503 of measuring, by the UE, the at least one to-be-measured object in the RRC idle mode may be directly performed after S502 without considering factors such as quality of service of the service object of the UE.

Optionally, S503 of measuring, by the UE, the at least one to-be-measured object in the RRC idle mode may be performed based on Condition 1 after S502. Condition 1 may be a UE feature for performing a measurement. The UE feature for performing a measurement may be a performance feature of the UE, or may be information about a bearer that needs to be established by the UE. This is not specifically limited in this application.

For example, Condition 1 may be that the UE has the UE feature for performing a measurement, for example, whether the UE supports carrier aggregation. If the UE cannot support carrier aggregation, the UE does not perform the measurement in S503.

Alternatively, Condition 1 may be that the information about the bearer that needs to be established by the UE indicates that a service to be initiated by the UE is traffic intensive. For example, the bearer that needs to be established by the UE is a video service, to be specific, the bearer required by the UE needs a relatively large throughput to ensure a service requirement, and the UE performs the measurement in S503.

Further, when S503 of measuring, by the UE, the at least one to-be-measured object in the RRC idle mode may be performed based on Condition 1 after S502, as shown in FIG. 6A and FIG. 6B, before S503, the measurement method provided in this embodiment of this application may further include S503a.

S503a. The UE determines whether the UE has the UE feature for performing a measurement.

The UE feature for performing a measurement may be a preset rule, or may be included in the configuration information. This is not specifically limited in this embodiment of this application. Content of the UE feature for performing a measurement is already described in detail in S501, and details are not described herein again.

Optionally, if it is determined in S503a that the UE has the UE feature for performing a measurement, S503 is performed. If it is determined in S503a that the UE does not have the UE feature for performing a measurement, the received configuration information is discarded.

It should be noted that, based on an actual requirement, if it is determined in S503a that the UE does not have the UE feature for performing a measurement, another operation may further be performed. This is not specifically limited herein.

For example, it is assumed that the UE feature for performing a measurement is that the UE is a video mobile phone. When a mobile phone without a video function receives the configuration information in S502, the mobile phone performs S503a and determines that the mobile phone is not a video mobile phone, and does not measure the to-be-measured object.

It should be noted that a process of measuring the to-be-measured object by the UE in S503 is the same as an existing measurement process, so that the process of measuring the to-be-measured object by the UE in S503 is not described in detail in this embodiment of this application. Any measurement performed on the to-be-measured object by the UE in the RRC idle mode shall fall within the protection scope of the solutions of this application.

According to the measurement solution provided in this application, the UE performs the measurement in the RRC idle mode, to avoid occupying the RRC connected mode in the measurement process, improve data transmission efficiency in the RRC connected mode, and further improve data transmission efficiency of a communications system.

Further, after the measurement in step S503, there may be a plurality of applications for the measurement result. For example, the measurement report may be sent, or quality of service is determined. Optionally, the measurement result may be directly applied after S503 is performed. Certainly, an execution condition may alternatively be set for an application of the measurement result. After S503, when the execution condition is satisfied, the measurement result is applied. The execution condition may be a mode of the UE, a state of the network device, a state of a network, or the like. Specific content of the execution condition is not limited in this embodiment of this application.

For example, when the application of the measurement result is sending a measurement report to the network device, an execution condition of the application may be set to that the UE enters an RRC connection establishment process or enters the RRC connected mode. Certainly, different execution conditions may be preset for different applications of the measurement result, and details are not described herein.

In a possible implementation, if an execution condition is set for an application of the measurement result, after S503, it is first determined whether the execution condition is satisfied, and if the execution condition is satisfied, the measurement result is applied. If the execution condition is not satisfied, the process of measuring, by the UE, the at least one to-be-measured object in the RRC idle mode based on the configuration information, to obtain a measurement result of the at least one to-be-measured object in S503 is performed again. In a process of performing S503 for a plurality of times, for a same to-be-measured object, a latest measurement result is recorded, to ensure timeliness of the measurement result.

Further, optionally, a feasible application of the measurement result is that the UE sends a measurement report to the network device, to feed back a response to the configuration information sent by the network device in S501. Therefore, as shown in FIG. 6A and FIG. 6B, after S503, the measurement method provided in this embodiment of this application may further include S504 and S505.

S504. The UE sends a measurement report to the network device.

The measurement report includes report content of some or all of the at least one to-be-measured object. Report content of a to-be-measured object may include ID information of the to-be-measured object, or ID information and a measurement result of the to-be-measured object.

It should be noted that the ID information of the to-be-measured object is already described in detail in S501, and details are not described herein again.

Specifically, in S504, the UE needs to obtain the measurement report, and then sends the measurement report to the network device. If the measurement in S503 is the first measurement, the measurement report is generated based on content of the measurement report and a measurement report of the at least one to-be-measured object that is obtained through the measurement in S503. If the measurement in S503 is not the first measurement, an existing measurement report is updated based on content of the measurement report and a latest measurement report of the at least one to-be-measured object that is obtained through the measurement in S503.

The updating an existing measurement report may include: adding content to the measurement report, or deleting partial content from the measurement report, or replacing partial content in the measurement report. Content of a stored and updated measurement report is obtained based on a measurement result of a latest measurement.

Optionally, the content in the measurement report may be configured based on an actual requirement, and may specifically include but is not limited to the following two implementations.

In a first implementation, the measurement report includes report content of a to-be-measured object that is in the at least one to-be-measured object and whose measurement result satisfies a preset condition.

Optionally, in the first implementation, the measurement report may include ID information of the to-be-measured object that is in the at least one to-be-measured object and whose measurement result satisfies the preset condition.

For example, corresponding to the first implementation, in S504, the UE needs to first generate the measurement report, and then sends the measurement report to the network device. When the content of the measurement report is the first implementation, to be specific, the measurement report includes the report content of the to-be-measured object whose measurement result satisfies the preset condition, after S503, the UE first compares each measurement result of the at least one measured to-be-measured object with the preset condition, and then generates the measurement report or updates the measurement report.

In this example, the generating the measurement report is storing the report content of the to-be-measured object whose measurement result satisfies the preset condition as the measurement report.

In this example, the updating the measurement report ensures that the measurement report includes report content of a to-be-measured object whose measurement result satisfies the preset condition after a latest measurement. Specific implementations may include the following three cases:

Case 1: If a measurement result of a first to-be-measured object satisfies the preset condition, but the measurement report does not include report content of the first to-be-measured object, the report content of the first to-be-measured object is added to the measurement report. The first to-be-measured object is any to-be-measured object that is in the at least one to-be-measured object measured in S503 and whose measurement result satisfies the preset condition.

Case 2: If a measurement result of a second to-be-measured object satisfies the preset condition, but the measurement report includes report content of a previous measurement result of the second to-be-measured object, latest report content of the second to-be-measured object is added to the measurement report. The second to-be-measured object is any to-be-measured object that is in the at least one to-be-measured object measured in S503 and whose measurement result satisfies the preset condition.

Case 3: If a measurement result of a third to-be-measured object does not satisfy the preset condition, but the measurement report includes report content of the third to-be-measured object, the report content of the third to-be-measured object is deleted from the measurement report. The third to-be-measured object is any one of the at least one to-be-measured object measured in S503.

Second implementation: The measurement report includes report content of the at least one to-be-measured object measured by the UE.

For example, corresponding to the second implementation, in S504, the UE needs to first generate the measurement report, and then sends the measurement report to the network device. When the content of the measurement report is the second implementation, to be specific, the measurement report includes the report content of the at least one to-be-measured object measured by the UE in S503, after S503, the UE needs to generate the measurement report or update the measurement report.

In this example, the generating the measurement report is storing the report content of the at least one to-be-measured object measured by the UE in S503 as the measurement report.

In this example, the updating the measurement report ensures that the measurement report includes the report content of the at least one to-be-measured object measured by the UE in S503 after a latest measurement. Specific implementations may include the following two cases:

Case A: If the measurement report does not include report content of a fourth to-be-measured object, the report content of the fourth to-be-measured object is added to the measurement report. The fourth to-be-measured object is any one of the at least one to-be-measured object measured in S503.

Case B: If the measurement report includes report content of a previous measurement result of a fifth to-be-measured object, latest report content of the fifth to-be-measured object is added to the measurement report. The fifth to-be-measured object is any one of the at least one to-be-measured object measured in S503.

Further, optionally, based on the first implementation or the second implementation, the measurement report may include report content of to-be-measured objects arranged in descending order of measurement results, to be specific, the report content is sorted and stored in the measurement report.

Further, when the UE sends the measurement report to the network device in S504, a mode of the UE may not be limited, and may be configured based on an actual requirement.

For example, in S504, the UE may send the measurement report after entering the RRC connected mode, or in an RRC connection establishment process. Certainly, the UE may alternatively perform S504 in another mode in which communication with the network device is supported.

Specifically, when the UE sends the measurement report to the network device in S504, a dedicated message may be configured for sending the measurement report, or an existing communication message between the UE and the network device may be used to carry the measurement report for sending. A form of sending the measurement report is not specifically limited in this embodiment of this application. A message for sending the measurement report and a location of the measurement report in the message may be pre-specified and known by both the UE and the network device.

Optionally, in S504, the UE may send the measurement report to the network device in the RRC connected mode by using RRC signaling or an MAC CE. Alternatively, in the RRC connection establishment process, the UE sends the measurement report to the network device by using an Msg3 message or an Msg5 message.

Further, optionally, if the UE is only configured to send the measurement report to the network device when the UE enters the RRC connection establishment process or the RRC connected mode, after S503 and before S504, the measurement method provided in this embodiment of this application may further include S504a.

S504a. The UE queries an RRC mode of the UE.

The RRC mode may include the RRC idle mode, the RRC connection establishment process, and the RRC connected mode.

It should be noted that a process of querying the RRC mode of the UE in S504a is not described in detail in this embodiment of this application. In an actual application, the UE may perform S504a by querying information such as a status indication bit of the UE or a specific flag bit. Certainly, S504a may be performed in another manner. This is not specifically limited in this application.

Specifically, based on the RRC mode of the UE that is queried by the UE in S504, the UE selects to re-perform S503 or S504. If it is queried in S504a that the UE enters the RRC connection establishment process or the RRC connected mode, S504 is performed. If it is queried in S504a that the UE is in the RRC idle mode, S503 is re-performed. When S503 is performed for a plurality of times, a latest measurement result is recorded for a same to-be-measured object, and the measurement report is obtained based on the latest measurement result.

S505. The network device receives the measurement report sent by the UE.

The measurement report is obtained by the UE by measuring the at least one to-be-measured object in the RRC idle mode. The measurement report received in S505 is the measurement report sent in S504. The content of the measurement report is already described in detail in S504, and details are not described herein again.

As described in S504, when the UE sends the measurement report to the network device in S504, a dedicated message may be configured for sending the measurement report, or an existing communication message between the UE and the network device may be used to carry the measurement report for sending. A form of sending the measurement report is not specifically limited in this embodiment of this application. A message for sending the measurement report and a location of the measurement report in the message may be pre-specified and known by both the UE and the network device. Therefore, in S505, the network device accurately receives, based on the preconfigured message for sending the measurement report by the UE and the location of the measurement report in the message, the measurement report sent by the UE.

Optionally, in S505, the network device may receive, in the RRC signaling or the MAC CE, the measurement report sent by the UE in the RRC connected mode. Alternatively, the network device may receive, in the Msg3 or Msg5 message, the measurement report sent by the UE in the RRC connection establishment process.

Further, optionally, in S504, the UE may actively send the measurement report to the network device, or may send the measurement report to the network device based on a request of the network device. When the UE sends the measurement report to the network device based on the request of the network device in S504, as shown in FIG. 6A and FIG. 6B, before S504, the measurement method provided in this embodiment of this application may further include S504b and S504c.

S504b. The network device sends, to the UE, a request message used to request the UE to send the measurement report.

The RRC mode of the UE when the network device sends the request message in S504b may be configured based on an actual requirement. This is not specifically limited in this embodiment of this application. The request message sent by the network device in S504*b* may be separately sent, or may be sent together with an existing message. This is also not specifically limited in this embodiment of this application.

For example, the network device sends the configuration information in S501 and the request message in S504*b* together, to be specific, combines S501 and S504*b* into one step for execution.

For example, the network device adds the request message in S504*b* to an uplink (UL) information request message for sending.

S504*c*. The UE receives the request message that is sent by the network device and that is used to request the UE to send the measurement report.

Based on S504*b* and S504*c*, S504 is specifically implemented as: After receiving the request message, the UE sends the measurement report to the network device.

It should be noted that, in an actual application, S504*a* and S504*b* may be performed at the same time, or may be performed in sequence. This is not specifically limited in this embodiment of this application. FIG. 6A and FIG. 6B merely show an execution sequence of S504*a* and S504*b*, and does not constitute a specific limitation.

Further, the network device may perform a related configuration on the UE based on the measurement report, for example, adding a secondary resource. Optionally, as shown in FIG. 6A and FIG. 6B, after S505, the measurement method provided in this embodiment of this application may further include S506.

S506. The network device selects, based on the measurement report, at least one to-be-measured object and adds the at least one to-be-measured object as a secondary resource of the UE.

In S506, the network device selects, based on the measurement report, the to-be-measured object and adds the to-be-measured object as the secondary resource of the UE. An adding rule may be preset, and the to-be-measured object is added based on the adding rule. A specific adding process is not described in detail in this embodiment of this application.

For example, the adding rule may be that the first several to-be-measured objects in descending order of measurement results are selected and added as secondary resources of the UE. Certainly, the adding rule may be configured based on an actual requirement, and the example herein does not constitute a specific limitation.

The secondary resource is a concept relative to a primary resource. The secondary resource may include: a secondary cell, or a secondary carrier, or a secondary beam, or a secondary pilot.

The foregoing has mainly described the solutions provided in the embodiments of this application from perspectives of working processes of the UE and the network device. It may be understood that, to implement the foregoing functions, the UE and the network device include a corresponding hardware structure and/or software module for implementing each function. Persons skilled in the art should easily be aware that, in combination with the examples of units and algorithm steps described in the embodiments disclosed in this specification, this application may be implemented by using hardware or a combination of hardware and computer software in this application. Whether a function is performed by using hardware or hardware driven by computer software depends on particular applications and design constraints of the technical solutions. Persons skilled in the art may use different methods to implement the described functions for each particular application, but it should not be considered that the implementation goes beyond the scope of this application.

In the embodiments of this application, the UE and the network device may be divided into functional modules based on the foregoing method examples. For example, each functional module may be obtained through division for each corresponding function, or two or more functions may be integrated into one processing module. The integrated module may be implemented in a form of hardware, or may be implemented in a form of a software functional module. It should be noted that, in the embodiments of this application, module division is an example, and is merely a logical function division. In an actual implementation, another division manner may be used.

Figure 7:
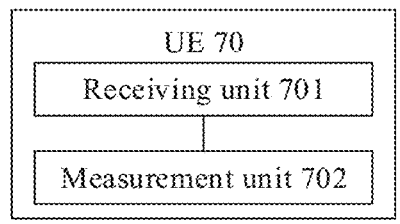
FIG. 7 is a schematic structural diagram of another UE according to an embodiment of this application.

When the functional modules corresponding to the functions are obtained through division, FIG. 7 is a possible schematic structural diagram of the UE in the foregoing embodiments. UE 70 may include a receiving unit 701 and a measurement unit 702. The receiving unit 701 is configured to support the UE 70 in performing processes S502 and S504*c* in FIG. 5 or FIG. 6A and FIG. 6B. The measurement unit 702 is configured to support the UE 70 in performing the process S503 in FIG. 5 or FIG. 6A and FIG. 6B. All related content of the steps in the foregoing method embodiment may be cited for describing functions of corresponding functional modules, and details are not described herein again.

Figure 8:
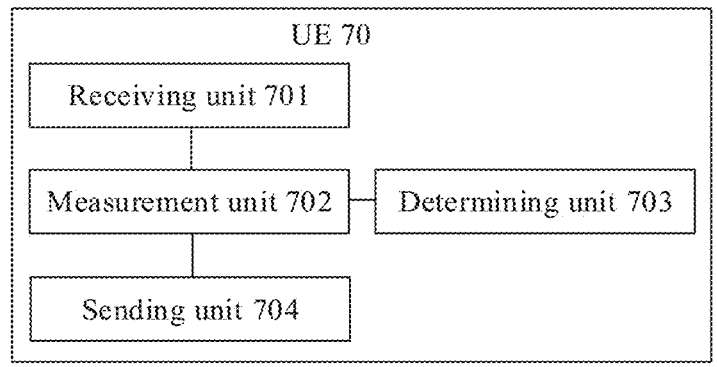
FIG. 8 is a schematic structural diagram of still another UE according to an embodiment of this application.

Further, as shown in FIG. 8, the UE 70 may further include a determining unit 703. The determining unit 703 is configured to support the UE 70 in performing the process S503*a* in FIG. 6A and FIG. 6B.

Further, as shown in FIG. 8, the UE 70 may further include a sending unit 704. The sending unit 704 is configured to support the UE 70 in performing the process S504 in FIG. 6A and FIG. 6B.

Figure 9:
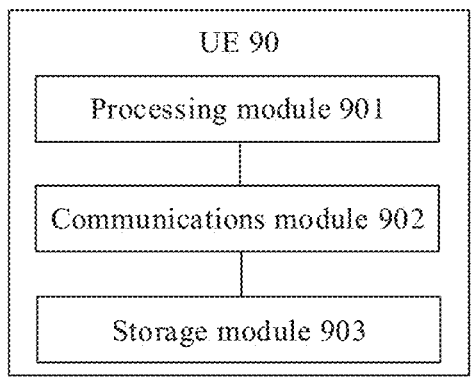
FIG. 9 is a schematic structural diagram of yet another UE according to an embodiment of this application.

When an integrated unit is used, FIG. 9 is a possible schematic structural diagram of the UE in the foregoing embodiments. UE 90 may include a processing module 901 and a communications module 902. The processing module 901 is configured to control and manage an action of the UE 90. For example, the processing module 901 is configured to support the UE 90 in performing the processes S503, S503*a*, and S504*a* in FIG. 5 or FIG. 6A and FIG. 6B; the communications module 902 is configured to support the UE 90 in communicating with another network entity; and the processing module 901 is configured to support the UE 90 in performing the processes S502, S504*c*, and S504 in FIG. 5 or FIG. 6A and FIG. 6B by using the communications module 902. The UE 90 may further include a storage module 903, configured to store program code and data of the UE 90.

The processing module 901 may be the processor 301 in the physical structure of the UE 30 shown in FIG. 3. The processing module 901 may be a processor or a controller, for example, may be a CPU, a general-purpose processor, a DSP, an ASIC, an FPGA or another programmable logic device, a transistor logic device, a hardware component, or any combination thereof. The processing module 901 may implement or execute various examples of logical blocks, modules, and circuits described with reference to content disclosed in this application. Alternatively, the processing module 901 may be a combination of processors implementing a computing function, for example, a combination of one or more microprocessors, or a combination of a DSP and a microprocessor. The communications module 902 may be the transceiver 304 in the physical structure of the UE 30 shown in FIG. 3. The communications module 902 may be a communications port, or may be a transceiver, a transceiver circuit, a communications interface, or the like. The storage module 903 may be the memory 302 in the physical structure of the UE 30 shown in FIG. 3.

When the processing module 901 is a processor, the communications module 902 is a transceiver, and the storage module 903 is a memory, the UE 90 in FIG. 9 in this embodiment of this application may be the UE 30 shown in FIG. 3.

As described above, the UE 70 or the UE 90 provided in the embodiments of this application may be configured to implement the method according to the foregoing embodiments of this application. For ease of description, only parts related to this embodiment of this application are shown. For undisclosed specific technical details, refer to the embodiments of this application.

Figure 10:
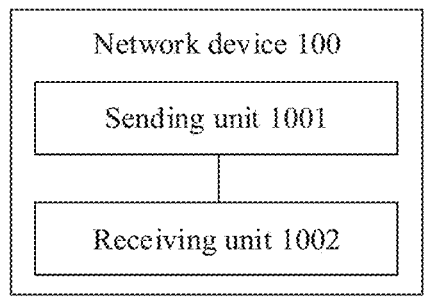
FIG. 10 is a schematic structural diagram of another network device according to an embodiment of this application.

When each functional module is obtained through division for each corresponding function. FIG. 10 is a possible schematic structural diagram of the network device in the foregoing embodiments. The network device 100 may include a sending unit 1001 and a receiving unit 1002. The sending unit 1001 is configured to support the network device 100 in performing the processes S501 and S504b in FIG. 5 or FIG. 6A and FIG. 6B. The receiving unit 1002 is configured to support the network device 100 in performing the processes S501b and S505 in FIG. 5 or FIG. 6A and FIG. 6B. All related content of the steps in the foregoing method embodiments may be cited for describing functions of corresponding functional modules, and details are not described herein again.

Figure 11:
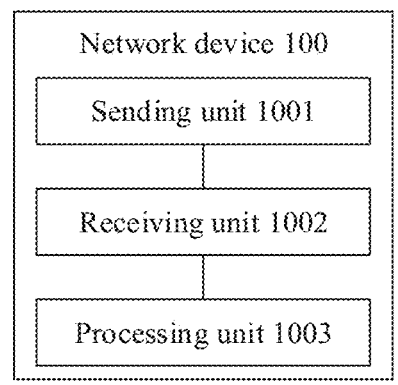
FIG. 11 is a schematic structural diagram of still another network device according to an embodiment of this application.

Further, as shown in FIG. 11, the network device 100 may further include a processing unit 1003. The processing unit 1003 is configured to support the network device 100 in performing the process S506 in FIG. 6A and FIG. 6B.

Figure 12:
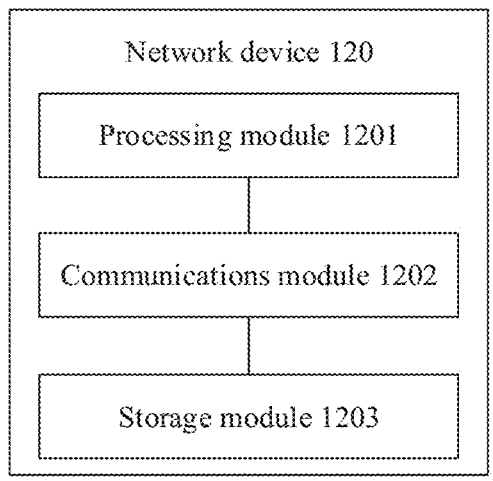
FIG. 12 is a schematic structural diagram of yet another network device according to an embodiment of this application.

When an integrated unit is used, FIG. 12 is a possible schematic structural diagram of the network device in the foregoing embodiments. A network device 120 may include a processing module 1201 and a communications module 1202. The processing module 1201 is configured to perform control management on an action of the network device 120. The communications module 902 is configured to support the network device 120 in communicating with another network entity. For example, the processing module 1201 is configured to support, by using the communications module 1202, the network device 120 in performing the processes S501b, S501, S504b, and S505 in FIG. 5 or FIG. 6A and FIG. 6B. The processing module 1201 is configured to support the network device 120 in performing the process S506 in FIG. 6A and FIG. 6B. The network device 120 may further include a storage module 1203, configured to store program code and data of the network device 120.

The processing module 1201 may be the processor 401 in the physical structure of the network device 40 shown in FIG. 4. The processing module 1201 may be a processor or a controller, for example, may be a CPU, a general-purpose processor, a DSP, an ASIC, an FPGA or another programmable logic device, a transistor logic device, a hardware component, or any combination thereof. The processing module 1201 may implement or execute various examples of logical blocks, modules, and circuits described with reference to content disclosed in this application. Alternatively, the processor module 1201 may be a combination of processors implementing a computing function, for example, a combination of one or more microprocessors, or a combination of a DSP and a microprocessor. The communications module 1202 may be the transceiver 404 in the physical structure of the network device 40 shown in FIG. 4. The communications module 1202 may be a communications port, or may be a transceiver, a transceiver circuit, a communications interface, or the like. The storage module 1203 may be the memory 402 in the physical structure of the network device 40 shown in FIG. 4.

When the processing module 1201 is a processor, the communications module 1202 is a transceiver, and the storage module 1203 is a memory, the network device 120 in FIG. 12 in the embodiment of this application may be the network device 40 shown in FIG. 4.

As described above, the network device 100 or the network device 120 provided in the embodiments of this application may be configured to implement the method implemented according to the foregoing embodiments of this application. For ease of description, only parts related to this embodiment of this application are shown. For specific technical details that are not disclosed, refer to the embodiments of this application.

According to still another aspect, an embodiment of this application provides a measurement system, including the UE according to any one of the foregoing embodiments.

According to yet another aspect, an embodiment of this application provides a measurement system, including the UE according to any one of the foregoing embodiments and the network device according to any one of the foregoing embodiments.

Method or algorithm steps described in combination with the content disclosed in this application may be implemented by using hardware, or may be implemented by a processor by executing a software instruction. The software instruction may include a corresponding software module. The software module may be stored in a RAM, a flash memory, a ROM, an erasable programmable read-only memory (EPROM), an electrically erasable programmable read-only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

Persons skilled in the art may clearly understand that, for the purpose of convenient and brief description, for a detailed working process of the foregoing system, apparatus, and unit, refer to a corresponding process in the foregoing method embodiments, and details are not described herein again.

Persons skilled in the art should be aware that in the foregoing one or more examples, functions described in this application may be implemented by using hardware, software, firmware, or any combination thereof. When this application is implemented by using software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer. Persons skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A measurement method, performed by a terminal device or an apparatus in a terminal device, comprising:
    receiving configuration information for the terminal device to measure at least one to-be-measured object associated with a secondary cell, wherein the terminal device supports carrier aggregation aggregating at least two carriers, wherein each of the at least two carriers corresponds to a primary cell or the secondary cell, and wherein the configuration information comprises a physical layer cell identification (ID) corresponding to the at least one to-be-measured object;
    measuring the at least one to-be-measured object in a radio resource control (RRC) idle mode according to the configuration information to obtain a measurement result of the at least one to-be-measured object and receiving a request message requesting to send a measurement report, wherein the measurement report comprises the measurement result that satisfies a preset condition.

2. The method according to claim 1, wherein the configuration information is included in a system broadcast message or an RRC connection release message.

3. The method according to claim 1, further comprising:
    sending, the measurement report, wherein the measurement report comprises_ID information and the measurement result of the at least one to-be-measured object in the RRC idle mode.

4. The method according to claim 3, wherein the measurement result satisfies a preset condition.

5. The method according to claim 4, wherein the configuration information further comprises at least one of the preset condition or bandwidth information of the at least one to-be-measured object.

6. The method according to claim 4 wherein the preset condition is satisfied if the measurement result is greater than a preset threshold.

7. The method according to claim 1, wherein the at least one to-be-measured object comprises a cell, a carrier, a beam, or a pilot.

8. The method according to claim 5, wherein the ID information of the at least one to-be-measured object comprises:
    a conversion ID of a physical layer cell ID, a conversion ID of a global cell ID, center frequency information, or frequency information.

9. A method, performed by a network device or an apparatus in a network device, comprising:
    sending configuration information for a terminal device to measure at least one to be measured object associated with a secondary cell, wherein the terminal device supports carrier aggregation aggregating at least two carriers, wherein each of the at least two carriers corresponds to a primary cell or the secondary cell, and wherein the configuration information comprises a physical layer cell identification (ID) corresponding to the at least one to-be-measured object; and
    sending a request message to request the terminal device to send a measurement report comprising a measurement result that satisfies a preset condition; and
    receiving the measurement report wherein the measurement report is obtained by the terminal device by measuring the at least one to-be-measured object in a radio resource control (RRC) idle mode.

10. The method according to claim 9, wherein the configuration information instructs the terminal device to measure the at least one to-be-measured object in the RRC idle mode, and wherein the configuration information is included in a system broadcast message or an RRC connection release message.

11. The method according to claim 9, the method further comprises:
    before receiving the measurement report, sending a request message to request the terminal device to send the measurement report, wherein the measurement report comprises the measurement result that satisfies a preset condition.

12. The method according to claim 9, the method further comprises:

selecting according to the measurement report, the at least one to-be-measured object; and adding the at least one to-be-measured object as a secondary resource of the terminal device.

13. A communication apparatus, comprising:
at least one processor; and
one or more memories coupled to the at least one processor and storing programming instructions for execution by the at least one processor to:
  receive configuration information for a terminal device to measure at least one to-be-measured object associated with a secondary cell, wherein the configuration information comprises a physical layer cell identification (ID) corresponding to the at least one to-be-measured object; and
  measure the at least one to-be-measured object in a radio resource control (RRC) idle mode according to the configuration information to obtain a measurement result of the at least one to-be-measured object, wherein the terminal device supports carrier aggregation aggregating at least two carriers, and wherein each of the at least two carriers corresponds to a primary cell or the secondary cell; and
  receive a request message requesting to send a measurement report comprising the measurement result that satisfies a preset condition.

14. The communication apparatus according to claim 13, wherein the configuration information is included in a system broadcast message or an RRC connection release message.

15. The communication apparatus according to claim 13, wherein the programming instructions are for execution by the at least one processor to:
  send the measurement report comprising ID information and the measurement result of the at least one to-be-measured object in the RRC idle mode.

16. The communication apparatus according to claim 6, wherein the measurement result satisfies a preset condition.

17. A communication apparatus comprising:
at least one processor; and
one or more memories coupled to the at least one processor and storing programming instructions for execution by the at least one processor to perform operations comprising:
  sending configuration information for a terminal device to measure at least one to-be-measured object associated with a secondary cell, wherein the terminal device supports carrier aggregation aggregating at least two carriers, wherein each of the at least two carriers corresponds to a primary cell or the secondary cell, and wherein the configuration information comprises a physical layer cell identification (ID) corresponding to the at least one to-be-measured object; and
  sending a request message to request the terminal device to send a measurement report comprising a measurement result that satisfies a preset condition
  receiving the measurement report, wherein the measurement report is obtained by the terminal device by measuring the at least one to-be-measured object in a radio resource control (RRC) idle mode.

18. The communication apparatus according to claim 17, wherein the configuration information instructs the terminal device to measure the at least one to-be-measured object in the RRC idle mode, and wherein the configuration information is included in a system broadcast message or an RRC connection release message.

19. The communication apparatus according to claim 17, the operations further comprising:
  selecting according to the measurement report, the at least one to-be-measured object; and
  adding the at least one to-be-measured object as a secondary resource of the terminal device.

* * * * *

UNITED STATES PATENT AND TRADEMARK OFFICE
CERTIFICATE OF CORRECTION

PATENT NO. : 11,792,669 B2
APPLICATION NO. : 16/787568
DATED : October 17, 2023
INVENTOR(S) : Jinhua Miao et al.

It is certified that error appears in the above-identified patent and that said Letters Patent is hereby corrected as shown below:

In the Claims

Column 28, Line 4, Claim 1, please delete "object" and insert therefore -- object; --;

Column 28, Line 14, Claim 3, please delete "comprises_ID" and insert therefore -- comprises ID --;

Column 28, Line 38, Claim 9, please delete "to be measured" and insert therefore
-- to-be-measured --;

Column 28, Line 49, Claim 9, please delete "report" and insert therefore -- report, --;

Column 29, Line 37, Claim 16, please delete "claim 6," and insert therefore -- claim 15, --;

Column 30, Line 34 (Approx.), Claim 19, please delete "selecting" and insert -- selecting, --.

Signed and Sealed this
Seventh Day of May, 2024

Katherine Kelly Vidal
*Director of the United States Patent and Trademark Office*